(12) United States Patent
Oetiker

(10) Patent No.: US 6,345,551 B1
(45) Date of Patent: Feb. 12, 2002

(54) BALANCING ARRANGEMENT FOR HOLLOW DRIVE SHAFTS

(75) Inventor: Hans Oetiker, Horgen (CH)

(73) Assignee: Hans Oetiker AG Maschinen-Und Apparatefabrik, Horgen (CH)

( * ) Notice: Subject to any disclaimer, the term of this patent is extended or adjusted under 35 U.S.C. 154(b) by 448 days.

(21) Appl. No.: 08/766,212

(22) Filed: Dec. 12, 1996

Related U.S. Application Data

(63) Continuation-in-part of application No. 07/446,812, filed on Dec. 6, 1989, and a continuation-in-part of application No. 07/629,717, filed on Dec. 18, 1990, now Pat. No. 5,230,246.

(51) Int. Cl.$^7$ .......................... F16F 15/22; B65D 63/02; F16L 33/00; F16L 33/22
(52) U.S. Cl. .......................... 74/573 R; 74/572; 74/574; 24/20 R; 24/20 CW; 24/20 EE; 464/180
(58) Field of Search .............................. 74/573 R, 572, 74/574; 24/200 W, 23 EE, 20 R; 464/180

(56) References Cited

U.S. PATENT DOCUMENTS

| | | | | |
|---|---|---|---|---|
| 162,725 A | * | 4/1875 | Weil | 24/20 R |
| 192,978 A | * | 7/1877 | DeGray | 24/20 CW |
| 1,705,895 A | * | 3/1929 | Blair | 24/20 CW |
| 2,941,631 A | * | 6/1960 | Fosberry et al. | 188/218 |
| 3,402,436 A | | 9/1968 | Oetiker | 24/20 |
| 3,901,046 A | * | 8/1975 | Hofmann | 74/574 X |
| 4,106,799 A | | 8/1978 | Oetiker | 285/365 |
| 4,299,012 A | * | 11/1981 | Oetiker | 24/19 |
| 4,492,004 A | * | 1/1985 | Oetiker | 24/20 R |
| 4,882,814 A | * | 11/1989 | Takahashi | 24/20 R |
| 4,910,832 A | * | 3/1990 | Schaub et al. | 24/20 R |
| 5,230,246 A | * | 7/1993 | Oetiker | 74/573 R |
| 5,537,721 A | | 7/1996 | Oetiker | 24/20 |

FOREIGN PATENT DOCUMENTS

| | | | | |
|---|---|---|---|---|
| GB | | 943486 | * 12/1963 | 24/20 CW |

\* cited by examiner

Primary Examiner—Vinh T. Luong
(74) Attorney, Agent, or Firm—Birch, Stewart, Kolasch & Birch, LLP

(57) ABSTRACT

A clamp structure and a balancing arrangement for a rotating member by means of the clamp structure, in which a counterweight of predetermined size and weight selected to compensate for an imbalance in the rotating member is securely fastened to the rotating member by the clamp structure which extends over the counterweight to thereby fixedly secure the counterweight onto the external surfaces of the rotating member in a predetermined position; the clamp structure includes a clamping band having inner and outer band end portions overlapping in the installed condition of the clamp structure with a mechanical connection for mechanically connecting the free ends of the clamping band and with a tightening arrangement for tightening the clamping band about the rotating member whereby the mechanical connection and/or the tightening arrangement are located within a circumferential area of the clamping band also containing the counterweight; in one embodiment the tightening arrangement is provided with reinforcing means formed by several side-by-side indentations to enable the use of heavier counterweights and in another embodiment the mechanical connection is provided with a special hook structure to achieve a similar result.

83 Claims, 6 Drawing Sheets

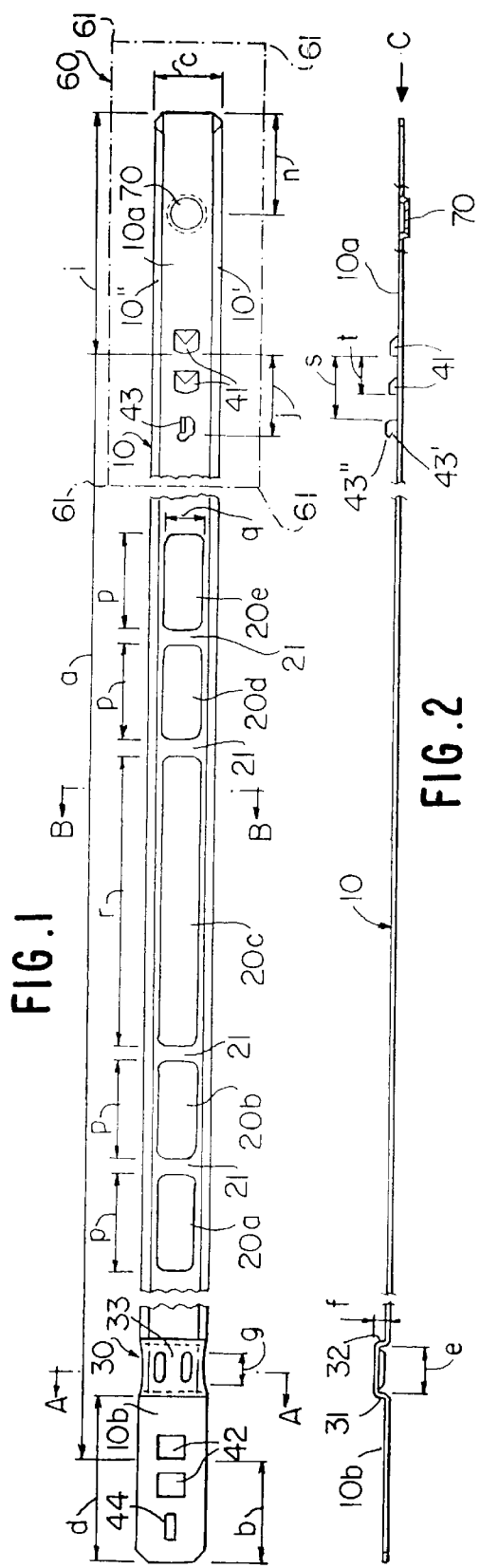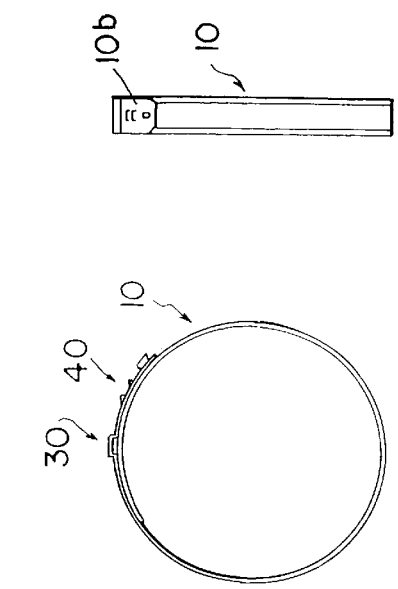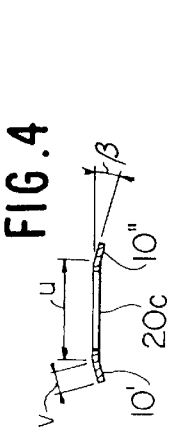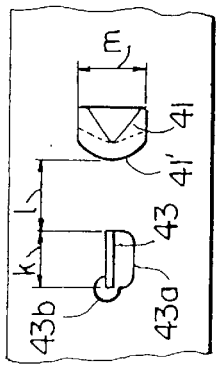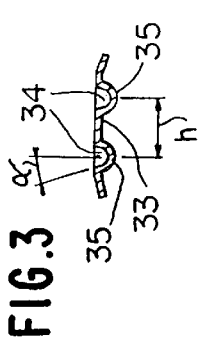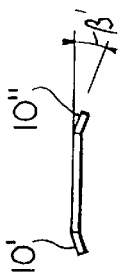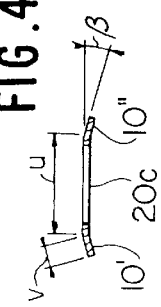

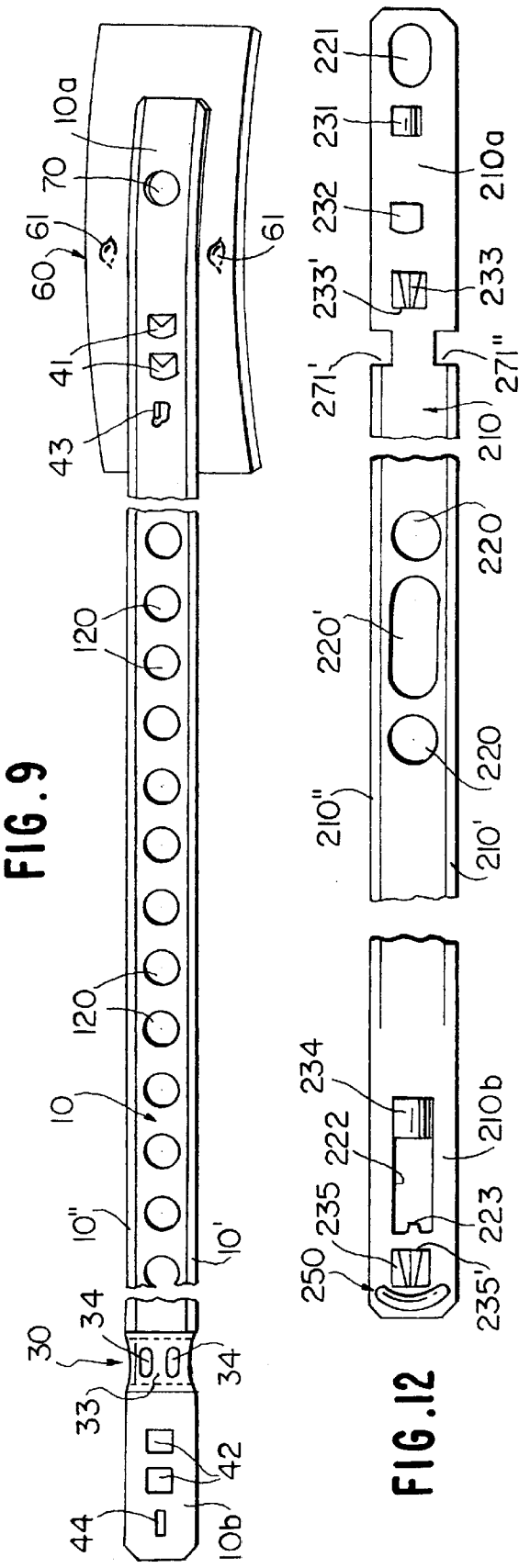
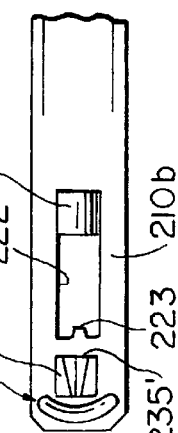
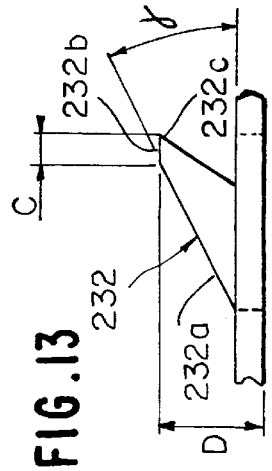
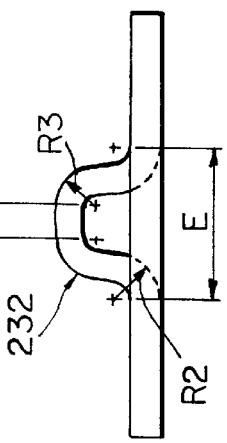
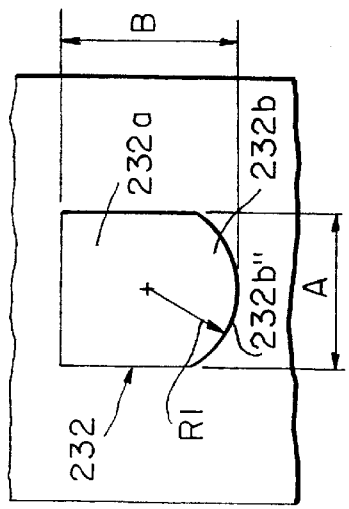

| EXTENSION (mm) | 1.000 | 2.000 | 3.000 | 4.000 | $F_m$ (N) | $\Delta L_m$ (mm) |
|---|---|---|---|---|---|---|
| (N) | 440.4 | 732.4 | 858.3 | 899.2 | 1000 | 9.384 |

| EXTENSION (mm) | 1.000 | 2.000 | 3.000 | 4.000 | $F_m$ (N) | $\Delta L_m$ (mm) |
|---|---|---|---|---|---|---|
| (N) | 190.3 | 601.6 | 755.3 | 832.4 | 1000 | 10.24 |

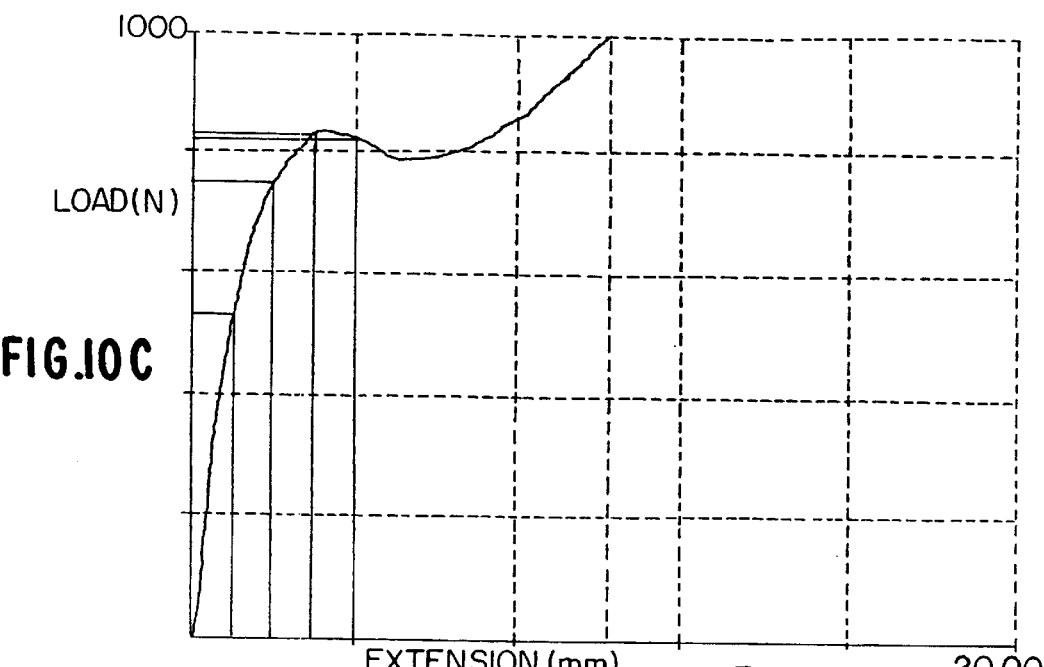
| EXTENSION(mm) | 1.000 | 2.000 | 3.000 | 4.000 | $F_m$ (N) | $\Delta L_m$ (mm) |
|---|---|---|---|---|---|---|
| (N) | 533.2 | 751.1 | 828.6 | 821.7 | 1000 | 10.23 |
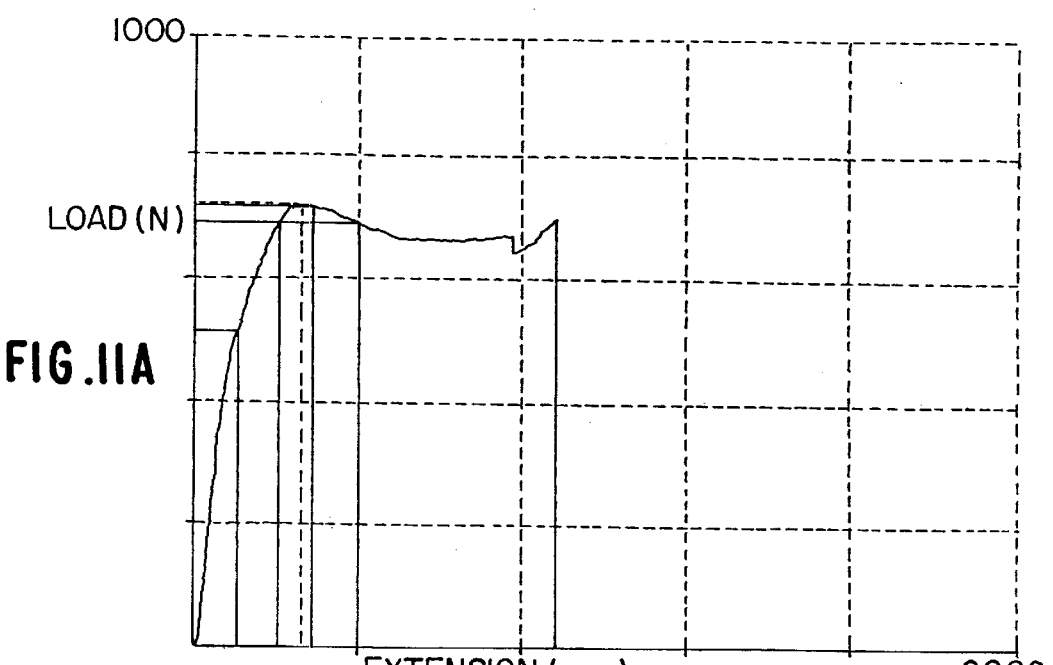
| EXTENSION(mm) | 1.000 | 2.000 | 3.000 | 4.000 | $F_m$ (N) | $\Delta L_m$ (mm) |
|---|---|---|---|---|---|---|
| (N) | 518.9 | 688.9 | 718.7 | 692.0 | 723.3 | 2.651 |

| EXTENSION (mm) | 1.000 | 2.000 | 3.000 | 4.000 | Fm (N) | ΔLm (mm) |
|---|---|---|---|---|---|---|
| (N) | 388.8 | 583.6 | 604.2 | 582.3 | 640.9 | 8.098 |

| EXTENSION (mm) | 1.000 | 2.000 | 3.000 | 4.000 | Fm (N) | ΔLm (mm) |
|---|---|---|---|---|---|---|
| (N) | 371.8 | 558.5 | 581.4 | 563.0 | 732.4 | 8.678 |

BALANCING ARRANGEMENT FOR HOLLOW DRIVE SHAFTS

RELATED U.S. APPLICATION DATA

This is a continuation-in-part application of the application Ser. No. 07/446,812, filed Dec. 6, 1989, and entitled "Balancing Arrangement for Rotating Member and Method of Making Same" and of the application Ser. No. 07/629,717, now U.S. Pat. No. 5,230,246, filed on Dec. 18, 1990, entitled "Balancing Arrangement For Rotating Members", and was copending with the application Ser. No. 07/446,812.

FIELD OF THE INVENTION

The invention relates to a balancing arrangement, and more particularly to an improved balancing arrangement for hollow drive shafts which allows for the compensation of greater imbalances.

BACKGROUND OF THE INVENTION

Balancing arrangements of various types are known in the prior art. For example, U.S. Pat. No. 3,901,046 to Hofmann discloses a balancing arrangement utilizing a clip to be tightened on the rotating member whereby counterweights are affixed to the clip within an area substantially opposite the connection of the free ends of the clip by means of a screw-type (worm-drive) connection. This type of arrangement is relatively complicated in installation because of the time-consuming determination of the imbalance and is also relatively inefficient because the counterweight must always offset also the screw-type connection of the open ends of the clip.

My prior U.S. application Ser. No. 07/446,812 avoids the shortcomings and drawbacks of Hofmann by placing the counterweight within the area of the mechanical connection of the open clamping band. With the earless construction as disclosed in FIGS. 1–5 of this application, sections having concavely shaped lateral band portions with an hourglass-like window defined therebetween are used to impart elastic stretchability in the longitudinal direction to the clamping band to compensate for thermal fluctuations of the drive shaft. The counterweight is thereby affixed to the clamping band by hook-like projections. In the embodiment of FIGS. 6–12, of the application Ser. No. 07/446,812, the tightening member is constituted by a plastically deformable ear whereby in FIGS. 10–12 the ear is made in one piece with the counterweight.

The U.S. Pat. No. 5,230,246 differs from the aforementioned copending application by a special construction of the plastically deformable ear which is provided with tab-like members intended to perform the dual function of avoiding problems in case of positional changes of the balancing arrangement and of increasing the strength of the ear-like member.

Hollow drive shafts are made to specified dimensions with a given accuracy. However, the greater the permissive tolerance in the external dimensions of the shaft, i.e., the greater the possible imbalance in the drive shafts, the greater must be the weight range of the counterweights to compensate for the imbalance. In other words, if drive shafts can be manufactured with lesser accuracy in the external dimensions which is desirable from a manufacturing cost point of view, then it becomes important to provide a balancing arrangement which is capable of securely handling counterweights of greater weight.

Recent developments have indicated a need to double the size of the maximum weight of the counterweight to be usable in the balancing arrangement. However, this goal has appeared unattainable with balancing arrangements as disclosed in the copending application Ser. No. 07/446,812 and the U.S. Pat. No. 5,230,246.

SUMMARY OF THE INVENTION

It is therefore a principal object of the present invention to provide a balancing arrangement and a preassembled clamp structure with an integral balancing counterweight which efficiently obviates the shortcomings and drawbacks encountered with the prior art constructions and assures reliable secure holding of counterweights with double the weight contemplated heretofore.

The underlying problems are solved according to this invention by a specific arrangement of the combination of clamp structure and counterweight. More specifically, the mechanical connection of the clamp structure must be able to withstand greater tightening forces for the increased weight of the necessary maximum counterweights and, with the use of a so-called "Oetiker" ear, the holding ability of the ear must also be substantially increased.

It has also been discovered that for most purposes, so-called "Oetiker" ears are able to provide sufficient compensation for thermal temperature changes of the drive shaft so that it is sufficient to provide elasticity on the part of the clamping band by the use of a clamping band of generally concave shape in transverse cross section. Elasticity may also be imparted to the counterweight by the use of a radius of curvature of its internal surface slightly smaller than the radius of curvature of the drive shaft.

A surprisingly greater holding ability of a clamp with a so-called "Oetiker" ear is attained by utilizing two side-by-side longitudinally extending reinforcing grooves having each a rounded-off bottom and delimited by substantially parallel side surfaces interconnected by semi-circular end surfaces, especially also with the use of a wider clamping band than normally used heretofore. A satisfactory holding ability could be attained with these modifications.

In case of the use of a so-called earless clamp in such a balancing arrangement, a strong mechanical connection of the clamp can be achieved with the use of a new support hook engaging from below into a tunnel-shaped aperture to securely hold the earless clamp structure in its installed and fully tightened position. The improved support hook offers greater resistance against buckling or collapse of the hook under the load of the outer clamping band portion during tightening and at the same time facilitate the sliding movement of the outer clamping band portion over a flat top portion in the novel support hook during tightening.

Additionally, it has also proven advantageous to connect the counterweight permanently to the clamping band by spot welding within the area of the inner band end portion between the mechanical connection and the free end in the inner band portion which permits an inexpensive and efficient preassembly of counterweight and clamp structure. In the alternative, a simple mechanical connection within the same area with a centering arrangement of the counterweight may be used in a modified embodiment of this invention.

In the case of a so-called earless clamp structure, a pressed-out reinforcement in the area of the free end of the outer band portion has also proved highly successful to avoid lifting up of the band during tightening of the clamp structure and to improve the stability of the tunnel-shaped member located near the free end of the outer band portion and involved in the tightening of the clamp structure.

In order to improve the effectiveness of the counterweight, the area of the clamping band opposite the mechanical connection and of the counterweight may be subjected to a weight reduction by the removal of clamping band material with the use of openings of various sizes, shapes and dimensions as well as of a varying number of such openings, as will be described more fully hereinafter.

BRIEF DESCRIPTION OF THE DRAWING

These and other objects, features and advantages of the present invention will become more apparent from the following description when taken in connection with the accompanying drawing which shows, for purposes of illustration only, several embodiments in accordance with the present invention, and wherein:

FIG. 1 is a plan view on a clamp structure of one embodiment for use in the balancing arrangement of the invention;

FIG. 2 is a side elevational view of the clamp structure of FIG. 1;

FIG. 3 is a cross-sectional view, taken along line A—A of FIG. 1;

FIG. 4 is a cross-sectional view, taken along line B—B of FIG. 1;

FIG. 5 is an end elevational view, taken in the direction of arrow C of FIG. 2;

FIG. 6 is a somewhat schematic partial plan view on an enlarged scale of certain details of the guide-and-support hook and of the support hook in the clamp structure of FIGS. 1 and 2;

FIG. 7 is an axial elevational view of the clamp structure in the non-tightened condition;

FIG. 8 is a side elevational view of FIG. 7;

FIG. 9 is a schematic plan view of a modified embodiment of the combination of clamp structure and counterweight for use in a balancing arrangement of this invention;

FIGS. 10A, 10B and 10C are graphs representing the test data obtained with a clamp structure having a reinforced ear structure as disclosed in U.S. Pat. No. 5,230,246;

FIGS. 11A, 11B and 11C are graphs representing the test data obtained with a clamp structure equipped with a reinforced plastically deformable ear of this invention;

FIG. 12 is a somewhat schematic partial plan view on a modified embodiment of a so-called earless clamp structure for use in a balancing arrangement of this invention;

FIG. 13 is a side elevational view on an enlarged scale of a new improved support hook forming part of the mechanical connection of an earless clamp structure of FIG 12;

FIG. 14 is an end elevational view of the support hook of FIG. 13;

FIG. 15 is a partial plan view on the support hook of FIG. 13;

DETAILED DESCRIPTION OF THE DRAWINGS

Figure 10A:
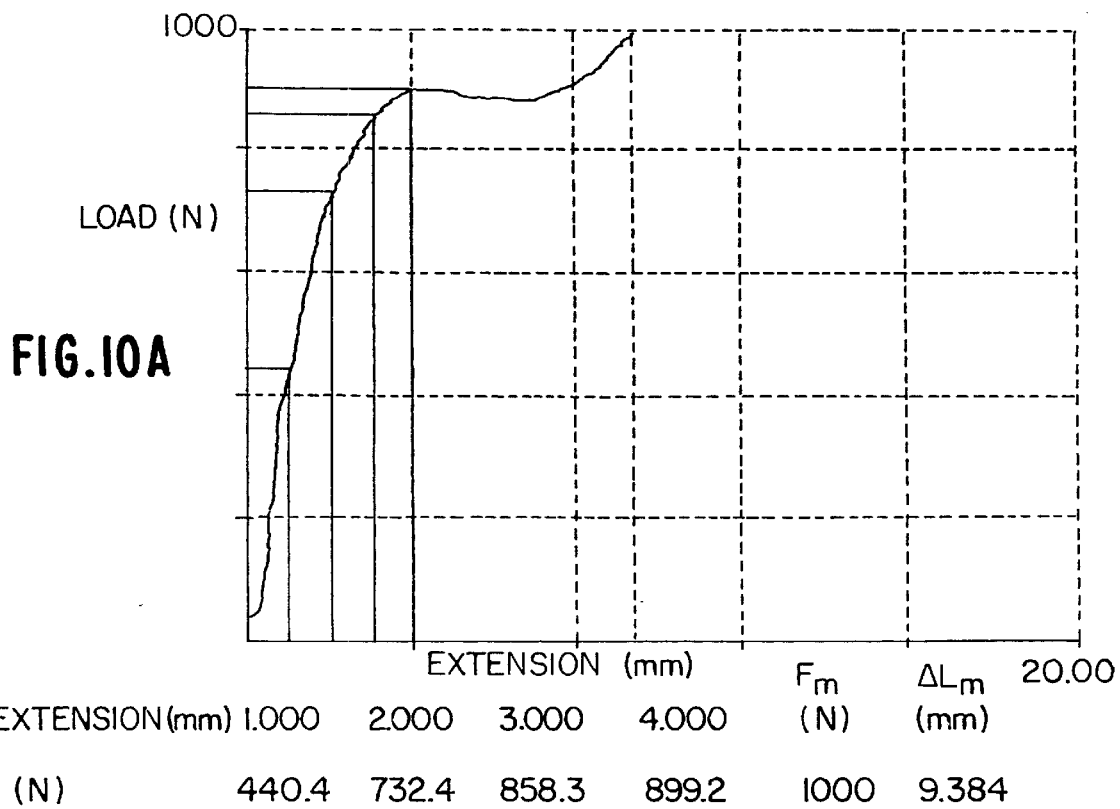

Referring now to the drawing wherein like reference numerals are used throughout the various views to designate like parts, the subject matter of the copending application Ser. No. 07/446,812 as well as of the U.S. Pat. No. 5,230,246 are incorporated herein by reference in their entirety so as to avoid unnecessary repetition of what is disclosed therein.

Referring first to FIGS. 1–8, reference numeral 10 generally designates a clamp structure which is provided with a so-called "Oetiker" ear generally designated by reference numeral 30 and a mechanical connection generally designated by reference numeral 40 (FIG. 7). The clamping band 10 includes an inner band portion 10a and an outer band portion 10b which, in the installed condition mutually overlap, at least in part. The lateral band portions 10' and 10" are bent down (FIG. 5) to impart elasticity to the clamping band by a more or less convex shape which seeks to flatten out as the clamp structure is tightened about the counterweight and rotating shaft. The lateral edges of the bent-down portions 10' and 10" will seek to dig into the external surfaces of the rotating member (not shown) and of the counterweight. To enhance the anchoring, these edges may also be non-smooth as realized by any means described in the copending application Ser. No. 07/446,812 and in U.S. Pat. No. 5,230,246.

The modified, plastically deformable ear generally designated by reference numeral 30 which serves as tightening means includes two generally outwardly extending leg portions 31 and 32 interconnected by a bridging portion 33 which is provided with a novel reinforcement arrangement (FIGS. 2 and 3). In the illustrated embodiment, the ear reinforcement arrangement is constituted by two groove-like reinforcing indentations 34, each having a rounded-off bottom 35, whereby each reinforcing groove is formed by substantially parallel, longitudinal side surfaces interconnected at each end by substantially semi-circularly shaped end portions as shown in FIGS. 1 and 3. The side surfaces as well as the end surfaces of a respective groove-like indentation 34 thereby slope down toward one another at an angle α with respect to the vertical, for example, at an angle of about 15 °to merge into the rounded-off bottom.

The mechanical connection generally designated by reference numeral 40 includes two cold-deformed, deep-drawn support hooks 41 which may be constructed as disclosed in my prior U.S. Pat. No. 4,299,012 or as shown more particularly in FIGS. 1, 2 and 6 of this application. Following the two support hooks 41 in a direction away from the free end of the inner band portion 10a is a novel guide and support hook 43 bent out of the clamping band about an axis extending generally in the longitudinal direction after two cuts as shown in greater detail in FIG. 6. The combined guide and support hook 43 includes, in addition to the usual upwardly extending oblique guide surface 43' (FIG. 2) a forwardly extending tip with a slightly downwardly extending tip end portion 43" to reliably prevent disengagement of the outer band portion 10b from the combined guide and support hook once the clamp structure is preassembled before tightening by engagement of the combined guide and support hook 43 in the slot-like aperture 44 in the outer band portion 10b. This particular configuration of the combined guide and support hook 43 is achieved by a first cut 43a and a subsequent part-circular second cut 43b which are made before the guide hook is bent out of the clamping band plane into its substantially vertical position. Rectangular, preferably square apertures 42 are provided in the outer band end portion 10b to receive the support hooks 41 as the two band end portions 10a and 10b are drawn toward one another by the surface 43' when the clamp is tightened by plastic deformation of the ear 30. The counterweight, generally designated by reference numeral 60 and shown in FIG. 1 in dash-and-dotted lines, which may be of any suitable size and/or thickness, is secured to the inner clamping band portion 10a intermediate its free end and the first support hook 41, for example, by welding schematically indicated at 70. To improve the anchoring of the counterweight, its corners 61 are bent down (not shown) so as to dig into the outer surface of the rotating member as the clamp structure is tightened. However, in addition to the anchoring achieved by the bent-down corners 61 or in lieu thereof, any of the anchoring arrangements disclosed in the copending application Ser. No. 07/446,812 or in U.S. Pat. No. 5,230,246 may also be used. The counterweight of predetermined weight and size may be made of any known material suitable therefor, such as of lead and alloys thereof, powdered metals or even of a commercially available lead tape provided with an adhesive surface which would also enhance anchoring.

To further the effectiveness of the counterweight as regards its effective weight, it is desirable to remove mass from the area of the clamp structure opposite to the counterweight. In the embodiment of FIG. 1, a number of rectangular apertures 20a, 20b, 20c, 20d and 20e are provided, which are located in the area of the clamp structure at least approximately opposite the area of the mechanical connection and the counterweight. The size and number as well as the configurations of the apertures may be selected as desired for a particular application, depending also on the strength of the material for the clamp structure. In the embodiment of FIG. 1, a relatively longer aperture 20c is followed on each side by two or more smaller apertures 20a, 20b and 20d, 20e with each aperture of substantially rectangular configuration having rounded-off corners. The width dimension of the web portions 21 between adjacent apertures, i.e., the dimension of these web portions 21 in the clamping band longitudinal direction, may again be chosen depending on the type of material used, for example, galvanized steel or stainless steel which have different strength properties. As a rule of thumb, the width of these web portions 21 should be at least about 20% to about 25% of the width of the clamping band. The circumferential area of the clamp structure covered by such apertures again depends on the strength of the material and can be empirically determined readily to optimize a given design. However, it follows that the greater this circumferential area, the greater will be the effect of the counterweight.

FIG. 9 illustrates a modified embodiment of a clamp structure for use in the balancing arrangement of this invention in which the rectangular apertures 20a, 20b, 20c, 20d and 20e of FIG. 1 are replaced by circular apertures 120 which may extend over substantially the entire clamping band portion intermediate the inner and outer band end portions 10a and 10b because of greater strength of this arrangement. Of course, it is also possible to use oval apertures and/or a combination of regularly or non-regularly following oval and circular apertures. As to the rest, the embodiment of FIG. 9 is similar to that of FIGS. 1 through 8.

Of course, in lieu of rectangular, circular or oval apertures or any mixture thereof, the clamping band used in the various embodiments of this invention may also be provided with elasticity-enhancing sections having concavely shaped lateral band portions defining therebetween an approximately hourglass-shaped window, as disclosed in the aforementioned copending application Ser. No. 07/446,812 or in U.S. Pat. No. 5,230,246. However, as such elasticity-enhancing sections entail certain difficulties in their manufacture by stamping out the concavely shaped outer edges of the lateral band portions, according to a modified embodiment illustrated in FIG. 19, the clamping band 10 may be provided with one or preferably several sections 220, each provided with a window 221 resembling the shape of an hourglass but retaining the substantially rectilinear outer edges 222a and 222b. The size, i.e., length and width as well as the curvature 223 of each section 220 and the width of the web portions 224 may be readily determined empirically to optimize the desired results in a given application, whereby the curvatures 223 are preferably part of a circular arc with a radius of curvature greater than one half, preferably two-thirds of the width of the clamping band. The window 221 also preferably has rounded-off corners 225 with a radius of curvature substantially smaller than the radius of curvature 223.

The following tests demonstrate the surprising greater holding ability of the ear structure of this invention compared to that of the reinforced ear structure of U.S. Pat. No. 5,326,325.

Figure 10B:
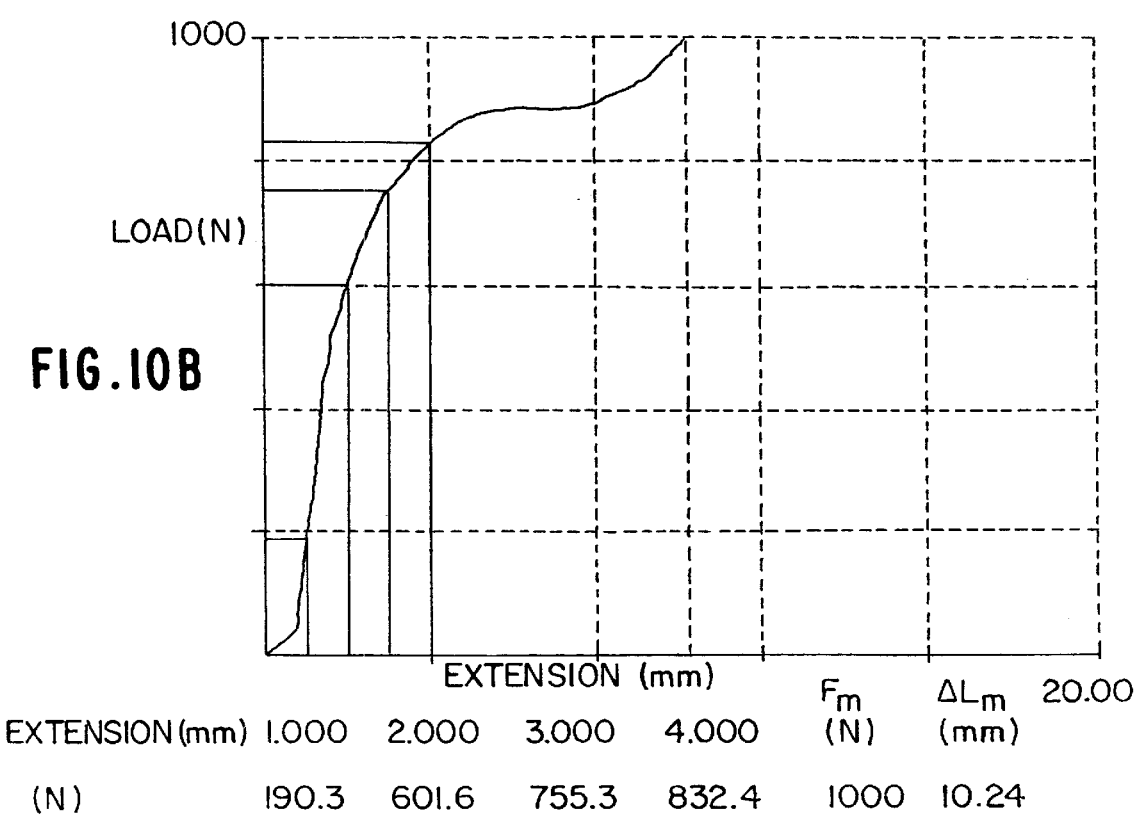

Table I sets forth the test data obtained with three clamp samples having the reinforced ear structure according to the aforementioned U.S. Pat. No. 5,326,325, while FIGS. 10A, 10B and 10C are graphs representing the test data obtained with the ear of the aforementioned patent.

Figure 11B:
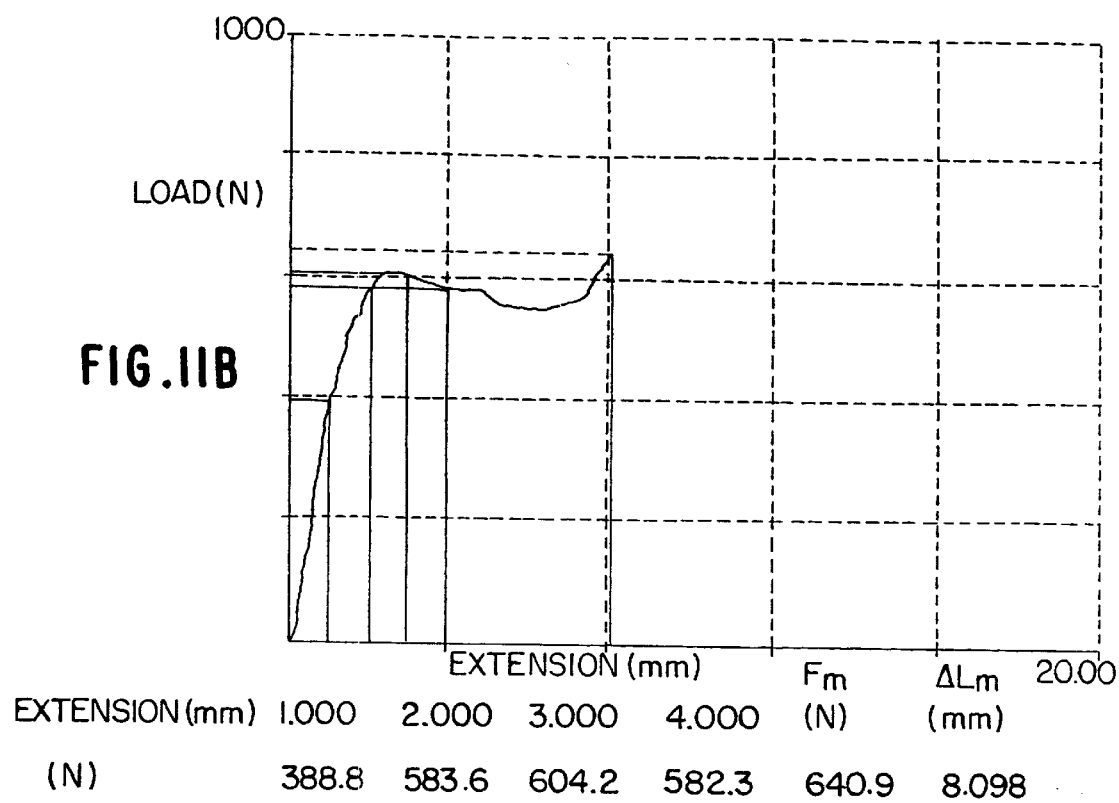
Figure 11C:
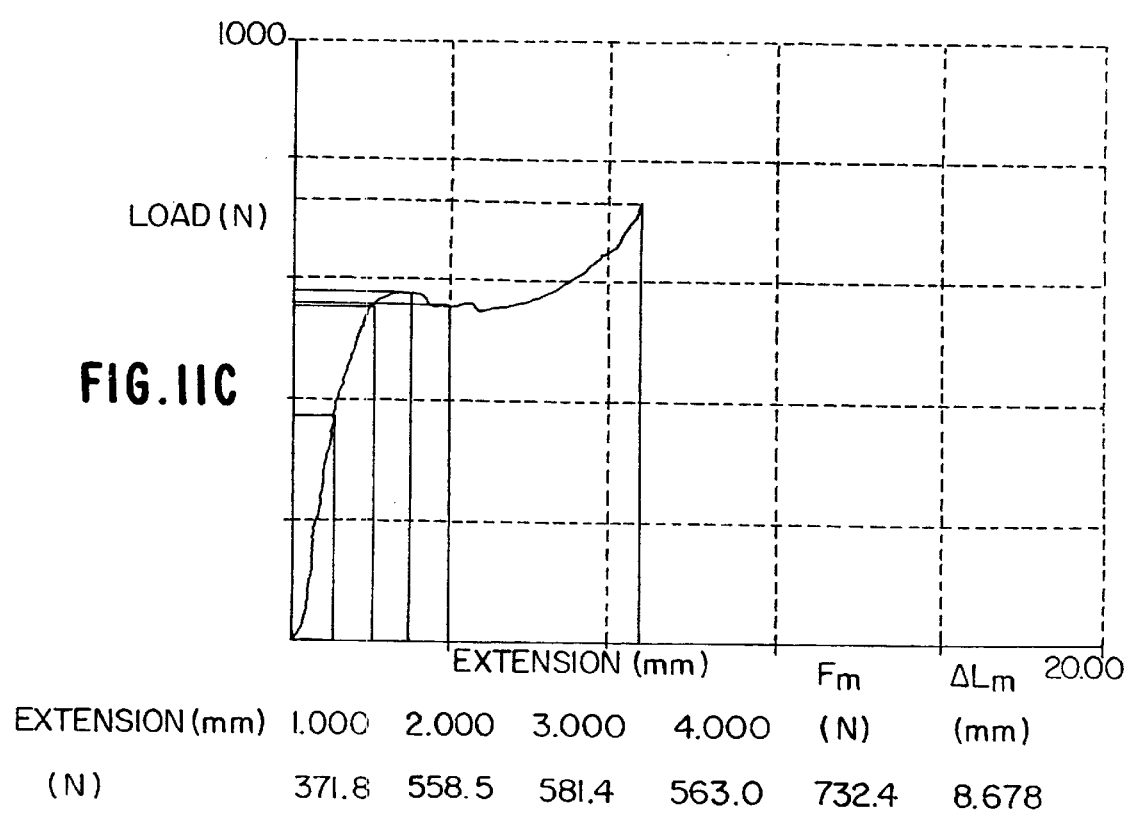

Table II shows the test data obtained with three clamp samples having an ear construction according to the embodiment of FIGS. 1 through 5, while FIGS. 11A, 11B and 11C again show graphically these test results.

TABLE I

| Extension (mm) | 1.000 | 2.000 | 3.000 | 4.000 | $F_m$ (N) | $\Delta L_m$ (mm) |
|---|---|---|---|---|---|---|
| Load 1 (N) | 518.9 | 688.9 | 718.7 | 692.0 | 723.3 | 2.651 |
| Load 2 (N) | 388.8 | 583.6 | 604.2 | 582.3 | 643.2 | 8.098 |
| Load 3 (N) | 371.8 | 558.5 | 581.4 | 563.0 | 732.4 | 8.678 |
| mean | 426.5 | 610.4 | 634.8 | 612.5 | 699.6 | 6.476 |
| standard deviation | 80.5 | 69.2 | 73.6 | 69.6 | 49.1 | 3.325 |

TABLE II

| Extension (mm) | 1.000 | 2.000 | 3.000 | 4.000 | $F_m$ (N) | $\Delta L_m$ (mm) |
|---|---|---|---|---|---|---|
| Load 1 (N) | 440.4 | 732.4 | 858.3 | 899.2 | 1000 | 9.384 |
| Load 2 (N) | 190.3 | 601.6 | 755.3 | 832.4 | 1000 | 10.24 |
| Load 3 (N) | 533.2 | 751.1 | 828.6 | 821.7 | 1000 | 10.23 |
| mean | 388.0 | 695.0 | 814.1 | 351.1 | 1000 | 9.954 |
| standard deviation | 177.3 | 81.4 | 53.0 | 42.0 | 0.0 | 0.493 |

A comparison of these tests reveals that the holding ability of the ear of the embodiment of FIGS. 1 through 5 is greatly improved over that in the aforementioned U.S. patent.

Figure 19:
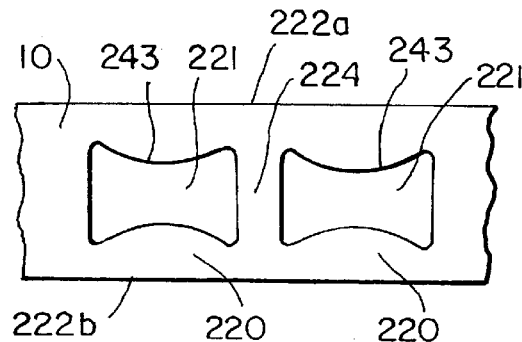
FIG. 19 is a partial plan view on the clamping band of a clamp structure with a modified construction of a weight-reducing opening.

As the tightening device in the form of a so-called "Oetiker" ear may not be desirable in some applications, it may become preferable to use a clamp structure in the balancing arrangement which obviates the "Oetiker" ear. Low-profile, also so-called earless clamp structures are known, for example, from my prior U.S. Pat. No. 4,492,004 in which the hooks in the inner band portion and their apertures in the outer band portion must be so located that the hooks can engage in these apertures only when the clamp has been tightened to the extent necessary to provide the predetermined clamping force, their location being thus also a function of the clamp size. FIG. 12 illustrates an improved low-profile, earless clamp structure for use in a balancing arrangement of this invention which has an improved mechanical connection, increases reliability in effecting the mechanical connection and is designed for easy and secure fastening of a counterweight. The clamping band generally designed by reference numeral 210 which is preferably made also of greater width like clamping band 10, is again provided with lateral bent-down portions 210' and 210" and includes an inner band end portion 210a and an outer band end portion 210b. Starting from the free end of the inner band end portion 210a, an elongated aperture 221 is provided with rounded-off end portions to receive a corresponding knub-like pressed-out part in the counterweight (not shown) which fits into aperture 221 for centering purposes. The counterweight may be of any known construction as disclosed in connection with counterweight 60 of FIG. 1. Next follows a tunnel-shaped member 231 pressed out by deep-drawing after two transverse cuts which forms part of the disconnecting means and is followed by a novel support hook 232 forming part of the mechanical connection and capable of absorbing higher circumferentially directed tightening forces in the completely tightened and installed condition of the clamp structure. The support hook 232 is again followed by a tunnel-shaped member 233 which forms part of the connecting means for tightening the reusable clamp structure. Next may follow a number of apertures, for example, circular apertures 220 alternating with oval apertures 220', the number and arrangement of which may be varied as known to those skilled in the art. Of course, also apertures as shown in FIG. 1 or apertures as shown in FIG. 19 may be used. In the alternative and/or in addition thereto also elasticity-imparting sections as disclosed in my aforementioned copending application or in my aforementioned U.S. Pat. No. 5,230,246 may be used, the location of such apertures and/or sections being preferably again at least within an area of the clamping band approximately opposite to the counterweight and/or mechanical connection and extending over a circumferential part of the clamping band which may include all but the clamping band end portions 210a and 210b. A tunnel-shaped member 234 which serves as part of the disconnecting means is adjoined directly by a substantially rectangular opening 222 provided with a tongue-like preassembly projection 223 in the transverse surface nearer the free end of the outer band portion 210b which is adapted to engage with tunnel-shaped member 231 to provide a preassembly. The opening 222, which is of such width that the tunnel-shaped member 231 can extend into the same, is followed by a tunnel-shaped member 235 forming part of the tightening means for tightening the reusable clamp. A pressed-out reinforcement 250 surrounds at least partially the tunnel-shaped member 235 in the free end area of the outer clamping band end portion 210b which surprisingly prevents a lifting-up of the free end of the outer band end portion when tightening the clamp and also imparts greater stability to the tunnel-shaped member 235. The tunnel-shaped member 231 is thereby of smaller configuration than tunnel-shaped member 234 so that it can slide under the latter, if necessary.

Figure 16:
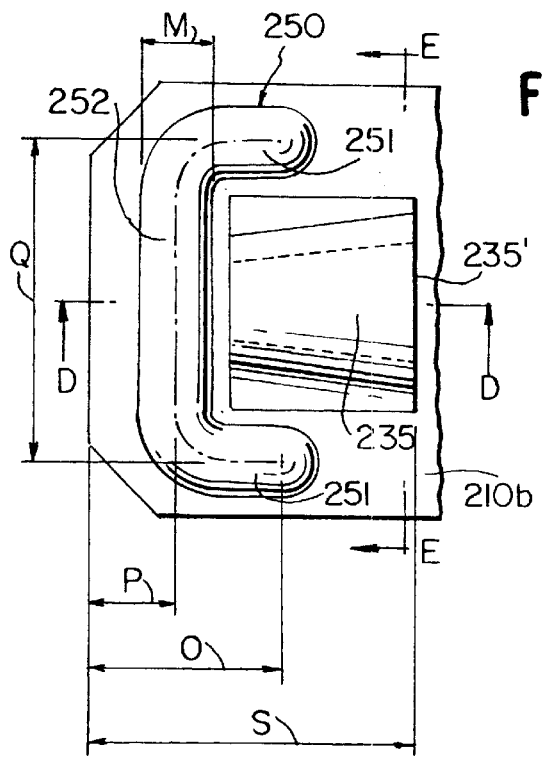
FIG. 16 is a partial plan view on an enlarged scale, showing a preferred embodiment of the novel reinforcement used in the end area of the outer band portion of the earless clamp structure of FIG. 12.
Figure 17:
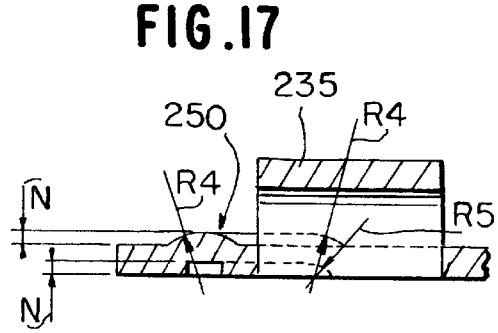
FIG. 17 is a cross-sectional view, taken along line D—D of FIG. 16.
Figure 18:
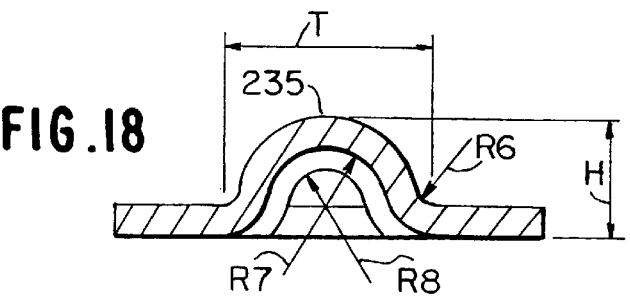
FIG. 18 is a cross-sectional view, taken along line E—E of FIG. 16.

A preferred embodiment of the front end reinforcement 250 is shown in FIGS. 16, 17 and 18 in which the reinforcement 250 extends not only transversely in front of tunnel-shaped member 235 with its transversely extending part 252 but also extends laterally of this tunnel-shaped member 235 in the longitudinal direction with its lateral parts 251 to thereby surround the tunnel-shaped member 235 in front thereof and along the sides thereof over at least nearly half the length. This reinforcement 250 effectively prevents the free end of the outer band portion 210b from lifting up when the clamp is tightened by engagement of a pincer-like tool at tool-engaging surfaces 235' and 233'.

FIGS. 13, 14 and 15 illustrate the details of the novel support hook 232 of this invention which forms part of the mechanical connection and which is pressed out by deep-drawing after a cut limited substantially to the circular portion 232b'' (FIG. 15) to assume the configuration as illustrated in FIG. 13 in which the substantially rectilinear ramp-like surface 232a slanting obliquely upwardly away from the free end of the inner band portion terminates in a substantially flat portion 232b forming a nose-like part 232c, by means of which, in the connected position, it engages from underneath in the opening of the tunnel-shaped member 235 in such a manner that the nose-like part 232c extends over and engages with the slanting guide surface 232d at the edge in the band end portion 10b formed by the transverse cut of the tunnel-shaped member 235 nearer the reinforcement 250. Engagement of the nose-like projection 223 in tunnel-shaped member 231 provides a preassembled condition. The substantially rectilinear slanting surface 232a and its flat portion 232b thereby facilitate tightening of the clamp structure as the outer band end portion 210b reinforced by reinforcement 250 slidingly rides up this ramp-like surface 232a and passes over the flat portion 232b during tightening of the clamp structure until the nose-like part 232c is able to snap into the opening underneath the tunnel-shaped member 235 so that the surface 232d can now engage with the transverse edge of the clamping band caused by the transverse cut for the tunnel-shaped member nearer the reinforcement 250. The flat portion 232b thereby improves the support hook 232 in several respects. The flat portion 232b greatly strengthens the hook 232 against buckling or collapsing as the outer band portion 210b slides up over the ramp-like surface 232a during tightening of the clamp, particularly as it reaches the upper end of this ramp-like surface. The flat portion 232b also facilitates the sliding movement of the outer band portions 210b during tightening of the clamp as it not only shortens the ramp-like surface 232a but facilitates this sliding movement by eliminating the inclined top portion of the ramp-like surface of prior support hooks and instead provides a flat surface which has a substantially constant radial distance in the installed clamp.

The earless clamp structure of FIGS. 12 through 18 is thereby installed and disassembled in a conventional manner as known to those skilled in the art by utilizing a tool seeking to draw together from the preassembled condition the tunnel-shaped members 233 and 235 and by utilizing a tool seeking to draw together the members 231 and 234 for reopening the clamp structure.

In lieu of a welded connection of the counterweight to the clamping band, the embodiment of FIG. 12 also illustrates cutouts 271' and 271" in the inner band end portion for fastening the counterweight which may be provided with corresponding hook-like members cut out from the counterweight by substantially parallel cuts and bent-up so that they can extend through these cutouts 271' and 271" and then be bent over to securely fasten the counterweight in the preassembled condition, whereby the knub-like projection engages in aperture 231 to hold the counterweight centered.

Typical values for the various embodiments are as follows, it being understood that these values are typical merely for one given embodiment of the invention and are not to be construed as limitative in any way of possible embodiments of this invention which may be varied as known to those skilled in the art. All dimensions indicated hereinafter are in millimeters and are taken from the drawings attached to the provisional application. The length dimension a depends on the diametric dimension of the clamp and in this particular embodiment is about 334 mm. and represents the length of the clamp from the free end of the inner band portion 10a to the edge nearer the free end of the outer band portion of the second aperture 42. The dimension b from this same edge of the second aperture 42 to the free end of the outer band portion 10b is about 21 mm. so that the overall length of the entire clamp is about 355 mm. The width c of the clamping band is 14 mm. and the dimension d from the free end of the outer band portion 10b to the outwardly extending leg 31 of the plastically deformable ear 30 is about 34 mm. The apertures 42 are each about 5.5 mm. in the clamping band transverse direction and about 5 mm. in the longitudinal direction of the clamping band. The width of the slot-like aperture 44 in the transverse direction is about 2 mm., and its length in the longitudinal direction is about 6 mm. The spacing between mutually facing edges of the apertures 42 is about 3 mm. which is also the spacing between adjacent edges of the slot-like aperture 44 and the first, i.e., next-adjoining aperture 42. The length e of the ear 30 in the longitudinal direction of the clamp is about 10 mm., and the height f is about 3.5 mm. The length g of each groove-like indentation 34 is about 6 mm., the radius of curvature of the rounded-off bottom 35 of each groove-like indentation is about 1 mm. and the spacing h between the centers of the bottoms of the groove-like indentation in the clamping band transverse direction is also about 6 mm. The angle α of the longitudinally extending lateral walls of each groove-like indentation which are inclined toward one another is about 15°. The leg portions 31 and 32 need not extend exactly at right angle to the surface of the clamping band but may form an angle of about 5° perpendicular to the clamping band surface (FIG. 2).

Turning to the opposite end of the clamp structure of FIGS. 1 through 8, the dimension i from the free end of the inner band portion 10a to the edge 41' of the support hook nearer the free end of the inner band portion is about 48.6 mm. and the spacing j from this edge 41' to the center of the part-circular cut 43b is about 10 mm. while the spacing between the center of cut 43b and the edge 41' of the support hook 41 remote from free end of the inner band portion 10a is about 10.2 mm. The diameter of the part-circular cut 43b is 2 mm., and the distance k in the longitudinal direction from the center of cut 43b to the end of the cut 43a is about 4.7 mm. so that the distance l is 5.5 mm. The diameter of the cut 43b is about 2 mm. and the radii of curvature in the cut 43a are about 1 mm. The width m in the transverse direction of each support hook 41 is about 5 mm. and the distance n of the center of the circular aperture 70 from the free end of the inner band portion 10a is about 21 mm. The apertures 20a, 20b, 20d and 20e have an overall length p in the longitudinal direction of about 20 mm. and a width q of about 8 mm. with the corners rounded off with a radius of curvature of about 2 mm. in the four corners thereof. The length r in the longitudinal direction of the longer aperture 20c is about 60 mm. with a width again of about 8 mm. and the corners thereof rounded with a radius of curvature of 2 mm. The mutual spacing between all apertures 20a, 20b, 20c, 20d and 20e is about 3 mm. As shown in FIG. 4, the angle of inclination β of the inclined lateral band portions within the area of aperture 20c is about 15° whereby the length of the remaining lateral band portions within the area of these apertures 20a through 20e is about 2 mm. As shown in FIG. 5 within the area of the inner clamping band portion 10a of the remaining lateral band portions, the angle β' may be about 20°. As shown in FIG. 2, the dimension s is about 13.5 mm. and the dimension t about 8 mm. As to the rest of the dimensions in the embodiment of FIGS. 1 through 8, they can be chosen to suit a particular application such as thickness of the material which in the given embodiment is 0.8 mm. The same is true for the material used which in the particular embodiment is AISI 304 stainless steel.

The embodiment of FIG. 9 is similar to the embodiment of FIGS. 1 through 8 except that the apertures 20a through 20e are replaced by regularly spaced openings 120 whose diameter can be selected at any desired value, depending on material to be used, and thickness of the clamping band material to enhance the effectiveness of the counterweight as mentioned above.

With respect to the clamp structure illustrated in FIG. 12, the improved guide-and-support hook 232 has a width A (FIG. 15) of about 4.4 mm. and a length B of about 5 mm. The part-circular cut portion 232b" is formed with a radius R of about 2.5 mm. The flattened portion 232b has a length C (FIG. 13) in the longitudinal direction of about 0.8 mm. with a height D of about 2.9 mm. The ramp-like inclined surface 232a forms an angle γ of about 27.7° (FIG. 13). The centers of the radii of curvature for the radii R2 are spaced from one another in the transverse direction of the clamping band a distance E of about 4.38 mm. (FIG. 14) with the radii of curvature R2 being about 1.3 mm. The distance of F between the radii of curvature for the radii R3 in FIG. 14 is about 0.98 mm. with the radii of curvature R3 being 1.1 mm.

With respect to the pressed-out embossment 250 and the tunnel-shaped member 235 illustrated in FIGS. 16 through 18, the width M (FIG. 16) in the longitudinal direction of the reinforcement 250 is 2 mm., the embossed pressed-out height N of the reinforcement (FIG. 17) obtained by deep-drawing is about 0.3 mm., the radii of curvature R4 (FIG. 17) are 1.82 mm. and the radius of curvature R5 is 0.57 mm. The spacing P of the center line of transversely extending portion 252 of the reinforcement 250 to the free end of the outer band portion 210b is about 2.5 mm., and the dimension O from the free end of the outer band portion 210b to the center of the semi-circular end portion of the two lateral portions 251 of the reinforcement 250 is 5.5 mm. whereby the center of the rounded-off ends of the lateral portions 251 are spaced from one another in the transverse direction a distance Q of about 9 mm. The tool-engaging surface 235' is spaced from the free end of the outer band portion 210b by a distance S of about 9 mm. The height H of the tunnel-shaped member 235 (FIG. 18) is about 3.2 mm., the spacing T in the transverse direction of the clamping band by the centers of the radii of curvature for radii R6 is 5.8 mm. (FIG. 18), and the radii of curvature R6 are about 0.5 mm. The radius of curvature R7 is 1.7 mm. and the radius of curvature R8 is 1.1 mm. The other dimensions of the clamp structure of FIG. 12 are readily ascertainable to a person skilled in the art from the design criteria used with earless clamp structures manufactured by and commercially available from the assignee of the instant application. It should also be noted that all dimensions are given in the flat condition of the clamping band.

Figure 20:
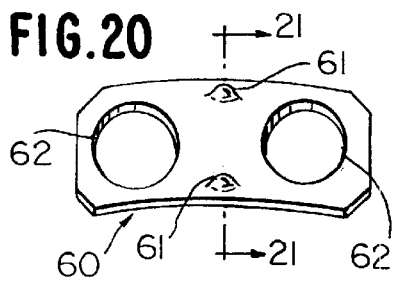
FIG. 20 is a somewhat schematic slightly perspective view of a plate-like counterweight member for use in this invention.
Figure 21:
FIG. 21 is a cross-sectional view taken along line 21—21 of FIG. 20.

To facilitate the task of selecting the proper counterweight, a counterweight of standard size may be used, for example, of rectangular configuration with the corners thereof chamfered off and all of the same dimensions which offer different weights by the number, size and locations of the openings 62 (FIG. 20) provided in the plate-like counterweight members 60. For example, the plate-like member without any openings may have a weight of 5 grams, and with two openings 62 as shown in FIG. 20 may have a weight of 2 grams. Intermediate values can be attained by the number and size of such openings. The person selecting the required counterweight can then assemble the required weight from a number of such plate-like members. To hold the plate-like members in a predetermined position relative to one another and to the clamping band as well as rotating member, each plate-like member is provided with a small pressed-out knub-like indentation 61 (FIGS. 20 and 21) which permits stacking the plate-like members in proper position and retaining the stacked plate-like members in such position.

In case the required weight for the counterweight is less than the weight of the connection of the overlapping band portions and the tightening means, it may be desirable to provide a balancing clamp structure preassembled by means of a counterweight so as to balance the clamp structure in itself. To that end, the plate-like member representing the combined weight of the connecting and tightening means may be permanently secured, for example, by welding in the area opposite the connecting and tightening means whereby only one or several small plate-like members need to be selected to balance the rotating member by placing these plate-like members in the correct position on the rotating member. By providing the permanently secured counterweight with knub-like indentations, the plate-like member(s) to compensate for the imbalance in the rotating member may then be assembled in stacked relationship to the permanently secured balancing weight. This permits the use of a standard size of plate-like members though also more than one standard size of plate-like members may be used provided they also include the pressed-out knub-like indentations to permit stacking with plate-like members of different sizes. Furthermore, standard sizes of different thickness may also be provided as long as the plate-like members are always provided with the means to enable stacking thereof. This not only facilitates the work of the person charged with balancing the rotating member but also keeps the assembled plate-like members in predetermined relative position by preventing relative movement once in stacked relationship. If the stack of plate-like members would become too high in a radial direction as installed on the rotating member, it is only necessary to use two clamp structures side-by-side to divide the number of stacked plate-like members used with each clamp structure.

Each of the features of a clamp as shown and described in connection with FIGS. 1, 2, 4, 6 and 9, of a clamp as shown and described in connection with FIGS. 12–15 or of a clamp as shown and described in connection with FIGS. 16–18 improve the holding ability of the respective clamp as explained above.

While I have shown and described several embodiments in accordance with the present invention, it is understood that the same is not limited thereto but is susceptible of numerous changes and modifications as known to those skilled in the art. For example, if elastic stretchability is required in the longitudinal direction of the clamp structure, it is also possible to utilize one or more sections of concavely shaped lateral band portions spaced by a window resembling an hourglass as disclosed in the aforementioned copending application. Furthermore, according to a preferred embodiment of this invention, in lieu of such sections, one or more undulations may be provided in the clamping band of suitable height and radius of curvature which are preferably provided in the outer band portion near the beginning of the overlap. Such tolerance-compensating undulation(s) would also compensate for differences in thickness of the counterweights and would therefore obviate the need to manufacture different clamps for different counterweight thicknesses. Additionally, any of the features described in the aforementioned copending application or the aforementioned U.S. patent, the subject matter of which is incorporated herein by reference may be used if desired. Furthermore, an auxiliary spring structure may also be incorporated in each of the various embodiments of the clamp structures described herein by utilizing the auxiliary spring arrangements as disclosed in my prior U.S. Pat. Nos. 5,111,555 and 5,138,747.

In lieu of a single wider clamping band with an "Oetiker" ear provided with the double-reinforcing groove arrangement, it would also be possible to use two side-by-side balancing arrangements, each with predetermined counterweight and each constructed as disclosed in the aforementioned application in order to increase the weight range of the balancing arrangement. However, for cost reasons and simplicity of installation, the arrangement in accordance with this invention is preferable, especially in applications of mass-produced items, such as drive shafts in the automotive industry, in which ease of installation is of great importance. Thus, while I have shown and described only several embodiments of this invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A balancing arrangement for a rotating member having external surfaces, comprising counterweight means of predetermined size and weight selected to compensate for an imbalance in the rotating member, and a clamp structure extending over said counterweight means and operable to tightly engage the external surfaces of the rotating member with the counterweight means in a predetermined position for fixedly securing said counterweight means onto the external surfaces of said rotating member in said predetermined position including clamping band means having inner and outer band end portions overlapping in the installed condition of the clamp structure, connecting means for mechanically connecting the free ends of said clamping band means, means for tightening the clamping band means about said rotating member, at least one of said connecting and tightening means being located within a circumferential area of the clamping band means also containing the counterweight means so that any weight of the connecting means is in effect additive to the weight of the selected counterweight means.

2. A balancing arrangement according to claim 1, wherein said tightening means includes plastically deformable ear means with two generally outwardly extending leg portions interconnected by a bridging portion provided with two transversely spaced reinforcing means to enable use of an increased weight of the counterweight means which the clamp structure is able to securely fasten to the rotating member.

3. A balancing arrangement according to claim 1, wherein the counterweight means includes counterweight anchoring means for anchoring the counterweight means in the external surfaces of the rotating member.

4. A balancing arrangement according to claim 3, wherein said counterweight means is of generally polygonal shape, and wherein said counterweight anchoring means includes bent-down corner areas operable to dig into the surface of the rotating member.

5. A balancing arrangement according to claim 1, wherein the clamping band means includes clamping band anchoring means for anchoring the clamping band means in the external surfaces of the rotating member and of the counterweight means.

6. A balancing arrangement according to claim 5, wherein said clamping band anchoring means includes bent-down lateral clamping band portions whose bent-down edges are operable to dig into the surfaces of the counterweight means and of the rotating member.

7. A balancing arrangement according to claim 6, wherein the bent-down edges of the clamping band anchoring means include ragged edges to enhance the anchoring effect.

8. A balancing arrangement according to claim 1, wherein said connecting means includes in one of said band end portions at least one pressed-out, deep-drawn support hook and one tab-like combined guide and support hook bent out of the clamping band means about an axis extending generally in the clamping band longitudinal direction, and in the other band end portion at least one approximately rectangular aperture for engagement by said support hook and one slot-like aperture extending generally in the clamping band longitudinal direction for engagement by said combined guide and support hook.

9. A balancing arrangement according to claim 8, wherein starting from the free end of the inner band portion said at least one support hook is followed in a direction away from said free end by said combined guide and support hook.

10. A balancing arrangement according to claim 9, wherein said counterweight means is fixed to said inner band end portion internally thereof in an area intermediate said free end of the inner band portion and said at least one support hook.

11. A balancing structure according to claim 10, wherein said counterweight means is securely fixed to said inner band end portion by welding.

12. A balancing arrangement according to claim 1, wherein said tightening means includes a plastically deformable ear means having two generally outwardly extending leg portions interconnected by a bridging portion including two substantially parallel groove-like deep-drawn indentations extending generally in the clamping band longitudinal direction.

13. A balancing structure according to claim 12, wherein said two deep-drawn groove-like reinforcing indentations are each of elongated shape delimited by substantially parallel longitudinal lateral surfaces interconnected by approximately semi-circular generally transversely extending connecting portions at the ends of each indentation.

14. A balancing arrangement according to claim 13, wherein each of said reinforcing indentations has a substantially rounded-off bottom with the lateral surfaces inclined from the top of the bridging portion downwardly and at least slightly toward one another to merge in the rounded-off bottom.

15. A balancing arrangement according to claim 13, wherein said groove-like reinforcing indentations are located in said bridging portion substantially symmetrically with respect to the longitudinal center plane of the clamping band means, and wherein the depth of each of said groove-like reinforcing indentations from the top of the bridging portion to the lower surface of the bottom is of the order of about 55% to about 65% of the height of the ear means from the top of the bridging portion to the bottom surface of the clamping band means in its rectilinear condition.

16. A balancing arrangement according to claim 12, wherein said ear means has a height of the order of about 3.5 mm.

17. A balancing arrangement according to claim 1, comprising further means in said clamping band means for enhancing the effective value of said counterweight means.

18. A balancing arrangement according to claim 1, wherein elasticity is imparted to said clamping band means by a generally convexly shaped configuration in a cross section transverse to the clamping band longitudinal direction which resists flattening during tightening of the clamping band means.

19. A balancing arrangement according to claim 18, wherein elasticity is imparted to said counterweight means by a curved configuration with a radius of curvature smaller than the radius of the rotating member.

20. A balancing arrangement according to claim 17, wherein said further means includes aperture means in said clamping band means within another area spaced from said circumferential area.

21. A balancing arrangement according to claim 20, wherein said another area spaced from said circumferential area is located at least within a circumferential area of the clamping band means generally opposite said first-mentioned circumferential area.

22. A balancing arrangement according to claim 21, wherein said aperture means include several elongated openings of substantially rectangular configuration interconnected by web portions.

23. A balancing arrangement according to claim 22, wherein said elongated openings have rounded-off corners, and wherein said web portions have a width in the clamping band longitudinal direction of at least about 20% of the width of the clamping band means.

24. A balancing arrangement according to claim 21, wherein said aperture means cover a circumferential area of the clamp structure of at least 45% of the entire clamp circumference when the connecting means closes the clamp structure.

25. A balancing arrangement according to claim 21, wherein said aperture means include at least one of circular openings and oval openings.

26. A balancing arrangement according to claim 1, further comprising means for imparting elastic stretchability to said clamping band means in the clamping band longitudinal direction including undulation means located on the side of said tightening means opposite the free end of said outer band end portion.

27. A balancing arrangement according to claim 26, wherein said undulation means are located in said clamping band means within an area close to said tightening means.

28. A balancing arrangement according to claim 21, wherein said tightening means includes plastically deformable ear means with two outwardly extending leg portions interconnected by a bridging portion provided with two transversely spaced reinforcing means to enable an increase in the weight of the counterweight means which the clamp structure is able to securely fasten to the rotating member.

29. A balancing arrangement according to claim 28, wherein said counterweight means includes anchoring means for anchoring said counterweight means in the surface of said rotating member, and wherein said clamping band means also includes anchoring means for anchoring said clamping band means in the surfaces of said rotating member and of said counterweight means.

30. A balancing arrangement according to claim 21, wherein said connecting means includes in one of said band end portions at least one pressed-out, deep-drawn support hook and one tab-like combined guide and support hook bent out of the clamping band means about an axis extending generally in the clamping band longitudinal direction, and in the other band end portion at least one approximately rectangular aperture for engagement by said support hook and one slot-like aperture extending generally in the clamping band longitudinal direction for engagement by said combined guide and support hook.

31. A balancing arrangement according to claim 21, wherein said tightening means includes a plastically deformable ear means having two generally outwardly extending leg portions interconnected by a bridging portion including two substantially parallel groove-like deep-drawn indentations extending generally in the clamping band longitudinal direction.

32. A balancing structure according to claim 31, wherein said two deep-drawn groove-like reinforcing indentations are each of elongated shape delimited by substantially parallel longitudinal lateral surfaces interconnected by approximately semi-circular generally transversely extending connecting portions at the ends of each indentation.

33. A balancing arrangement according to claim 32, wherein each of said reinforcing indentations has a substantially rounded-off bottom with the lateral surfaces inclined from the top of the bridging portion downwardly and at least slightly toward one another to merge in the rounded-off bottom.

34. A balancing arrangement according to claim 33, wherein said groove-like reinforcing indentations are located in said bridging portion substantially symmetrically with respect to the longitudinal center plane of the clamping band means, and wherein the depth of each of said groove-like reinforcing indentations from the top of the bridging portion to the lower surface of the bottom is of the order of about 55% to about 65% of the height of the ear means from the top of the bridging portion to the bottom surface of the clamping band means in its rectilinear condition.

35. A balancing arrangement according to claim 34, wherein said ear means has a height of the order of about 3.5 mm.

36. A clamp structure according to claim 1, wherein said counterweight means is made up from one or more plate-like members dependent on the required weight, said plate-like members being provided with pressed-out means to enable assembly of the required number of plate-like members in stacked relationship.

37. A clamp structure according to claim 36, wherein said pressed-out means include small pressed-out knub-like indentations.

38. A clamp structure according to claim 37, wherein said plate-like members are of standard dimensions whose weights are changed by at least one of number, size and location of the openings.

39. A balancing arrangement according to claim 1, further comprising means in said clamping band means to increase the holding ability of the clamp structure and therewith increase the weight of the counterweight means which can be reliably secured.

40. A balancing arrangement according to claim 39, wherein said means to increase the holding ability of the clamp structure is formed by a deep-drawn hook means forming part of the connecting means, said hook means having an inclined ramp-like surface which is adjoined by a flat reinforcing portion at the top thereof.

41. A balancing arrangement according to claim 40, wherein said clamp structure is of the earless, reusable type in which the tightening means are formed by deep-drawn, tunnel-shaped means in the inner and outer band portions and extending generally in the clamping band longitudinal direction, and wherein the inclined ramp-like surface extends obliquely outwardly in a direction away from the free end of the inner band end portion which is adjoined by said flat reinforcing portion at the top thereof.

42. A balancing arrangement according to claim 41, wherein said flat top portion forms a nose-like projection extending approximately horizontally away from the free end of the inner band and operable to engage from below in one of said tunnel-shaped means in the outer band end portion.

43. A balancing arrangement according to claim 41, wherein further tunnel-shaped means in the outer band portion and in the inner band end portion constitute means for reopening said clamp structure.

44. A balancing arrangement according to claim 41, further comprising pressed-out reinforcing means along the end of said outer band portion which extends at least in part about one of the tunnel-shaped means.

45. A balancing arrangement according to claim 44, wherein said pressed-out reinforcing means surrounds at least in part said first-mentioned tunnel-shaped means in the outer band portion.

46. A balancing arrangement according to claim 41, wherein, starting from the free end of said outer band portion, said clamp structure includes a pressed-out reinforcing means, said first-mentioned tunnel-shaped means in said outer band portion, an elongated opening provided with a tongue-like preassembly projection substantially centrally located in the transversely extending end surface near the free end of the outer band portion, the one of said second-mentioned tunnel-shaped means adjoining said elongated opening and forming part of the reopening means, and proceeding toward the end of the inner band portion, the one of the first-mentioned tunnel-shaped means forming part of the means for tightening the clamp structure, said deep-drawn hook means and the other of said second-mentioned tunnel-shaped means adapted to extend through said elongated opening and forming part of said reopening means.

47. A balancing arrangement according to claim 41, wherein at least one weight-removing aperture means is provided in the clamping band means intermediate said second-mentioned tunnel-shaped means in the outer band portion forming part of said means for reopening the clamp structure and the first-mentioned tunnel-shaped means in the inner band portion forming part of the means for tightening the clamp structure.

48. A clamp structure according to claim 41, further comprising means for imparting elastic stretchability to said clamping band means in the longitudinal direction thereof, said elasticity-imparting means being located in said clamping band means near the part thereof forming the overlapping outer band portion.

49. A balancing arrangement according to claim 48, wherein said elasticity-imparting means includes at least one undulation means.

50. A clamp structure for clamping a counterweight means to another part, comprising clamping band means having inner and outer band end portions overlapping in the installed condition of the clamp structure, connecting means for mechanically connecting the free ends of said clamping band means, means for tightening the clamping band means, means to enable securing of said counterweight means to said clamping band means and means in said clamping band means to increase the holding ability of the clamp structure and therewith increase the weight of the counterweight means which can be reliably secured to the part.

51. A clamp structure according to claim 50, wherein said tightening means includes plastically deformable ear means with two generally outwardly extending leg portions interconnected by a bridging portion provided with said means to increase the holding ability of the clamp structure which includes several transversely spaced reinforcing means formed by deep-drawn groove-like reinforcing indentations each of elongated shape delimited by substantially parallel longitudinal lateral surfaces interconnected by approximately semi-circular generally transversely extending connecting portions at the ends of each indentation.

52. A clamp structure according to claim 51, wherein each of said reinforcing indentations has a substantially rounded-off bottom with the lateral surfaces inclined from the top of the bridging portion downwardly and at least slightly toward one another to merge in the rounded-off bottom.

53. A clamp structure according to claim 52, wherein said angle is of the order of 15°.

54. A clamp structure according to claim 52, wherein said groove-like reinforcing indentations are located in said bridging portion substantially symmetrically with respect to the longitudinal center plane of the clamping band means, and wherein the depth of each of said groove-like reinforcing indentations from the top of the bridging portion to the lower surface of the bottom is of the order of about 55% to about 65% of the height of the ear means from the top of the bridging portion to the bottom surface of the clamping band means in its rectilinear condition.

55. A clamp structure according to claim 54, wherein said ear means has a height of the order of about 3.5 mm.

56. A clamp structure according to claim 50, wherein said connecting means includes in one of said band end portions at least one pressed-out, deep-drawn support hook and one tab-like combined guide and support hook bent out of the clamping band means about an axis extending generally in the clamping band longitudinal direction, and in the other band end portion at least one approximately rectangular aperture for engagement by said support hook and one slot-like aperture extending generally in the clamping band longitudinal direction for engagement by said combined guide and support hook.

57. A clamp structure according to claim 56, wherein starting from the free end of the inner band portion said at least one support hook is followed in a direction away from said free end by said combined guide and support hook.

58. A clamp structure according to claim 56, wherein said combined guide and support hook includes an upwardly extending oblique guide surface and a forwardly extending tip with a slightly downwardly extending tip end portion to prevent disengagement of the outer band portion from the combined guide and support hook.

59. A clamp structure according to claim 58, wherein said combined guide and support hook results from a first cut and a subsequent part-circular cut prior to bending the combined guide and support hook into its substantially vertical position.

60. A clamp structure according to claim 50, wherein said means to increase the holding ability of the clamp structure is formed by a deep-drawn hook means forming part of the connecting means, said hook means having an inclined ramp-like surface which is adjoined by a flat reinforcing portion at the top thereof.

61. A clamp structure according to claim 50, wherein said clamp structure is of the earless, reusable type in which the tightening means are formed by deep-drawn, tunnel-shaped means in the inner and outer band portions and extending generally in the clamping band longitudinal direction and the connecting means includes a deep-drawn support hook means in the inner band end portion having an inclined ramp-like surface extending obliquely outwardly in a direction away from the free end of the inner band portion which is adjoined by a flat reinforcing portion at the top thereof.

62. A clamp structure according to claim 61, wherein said flat top portion forms a nose-like projection extending approximately horizontally away from the free end of the inner band and operable to engage from below in the one of said tunnel-shaped means in the outer band end portion.

63. A clamp structure according to claim 61, wherein further tunnel-shaped means in the outer band portion and in the inner band end portion constitute means for reopening said clamp structure.

64. A clamp structure according to claim 61, further comprising pressed-out reinforcing means along the end of said outer band portion which extends at least in part about one of the tunnel-shaped means.

65. A clamp structure according to claim 64, wherein said pressed-out reinforcing means surrounds at least in part said first mentioned tunnel-shaped means in the outer band portion.

66. A clamp structure according to claim 61, wherein, starting from the free end of said outer band portion, said clamp structure includes a pressed-out reinforcing means, said first-mentioned tunnel-shaped means in the outer band portion, an elongated opening provided with a tongue-like preassembly projection substantially centrally located in the transversely extending end surface nearer the free end of the outer band portion, the one of said second-mentioned tunnel-shaped means adjoining said elongated opening and forming part of the reopening means, and proceeding towards the end of the inner band portion, the one of the first-mentioned tunnel-shaped means forming part of the means for tightening the clamp structure, said deep-drawn support hook means and the other of said second-mentioned tunnel-shaped means adapted to extend through said elongated opening and forming part of said reopening means.

67. A clamp structure according to claim 63, wherein at least one weight-removing aperture means is provided in the clamping band means intermediate said second mentioned tunnel-shaped means in the outer band portion forming part of said means for reopening the clamp structure and the first mentioned tunnel-shaped means in the inner band portion forming part of the means for tightening the clamp structure.

68. A clamp structure according to claim 63, further comprising means for imparting elastic stretchability to said clamping band means in the longitudinal direction thereof, said elasticity-imparting means being located in said clamping band means near the part thereof forming the overlapping outer band portion and including at least one undulation means.

69. A clamp structure according to claim 50, wherein said clamping band means is made from galvanized or stainless steel material substantially devoid of any significant elastic stretchability in its longitudinal direction, and further means in said clamping band means for imparting to said clamping band means predetermined elastic stretchability in at least one of its transverse and longitudinal directions.

70. A clamp structure according to claim 69, wherein said further means includes undulation means.

71. A clamp structure according to claim 70, wherein said undulation means are located in the outer band portion within an area at least near the beginning of overlap.

72. A clamp structure according to claims 69, wherein said elasticity is imparted to said clamping band means by a generally convexly shaped configuration in a cross section transverse to the clamping band longitudinal direction which resists flattening during tightening of the clamping band means.

73. A clamp structure according to claim 50, characterized by further means in said clamping band means for enhancing the effective value of a counterweight means located within a circumferential area of the clamping band means including aperture means in said clamping band means within another area spaced from said circumferential area, whereby said aperture means cover a circumferential area of the clamp structure of at least about 45% of the entire clamp circumference when the connecting means closes the clamp structure.

74. A clamp structure for balancing a rotating member according to claim 50, further comprising counterweight means of predetermined size and weight, said clamp structure extending over said counterweight means and being adapted to tightly engage external surfaces of a rotating member with the counterweight means in a predetermined position to thereby fixedly secure said counterweight means on said rotating member in said predetermined position, at least one of said connecting and tightening means being located within the same area of the clamping band means that also includes the counterweight means so that the weight of the one of connecting and tightening means is in effect additive to the weight of the counterweight means.

75. A clamp structure according to claim 74, wherein said counterweight means is secured to said clamping band means within the area of the connecting means and the free end of the inner band end portion.

76. A balancing arrangement according to claim 74, wherein the counterweight means is of substantially polygonal shape and includes anchoring means for anchoring the counterweight means in the external surfaces of the rotating member by bent-down corner areas of the counterweight means operable to dig into the surface of the rotating member.

77. A balancing arrangement according to claim 73, wherein the clamping band means includes clamping band anchoring means for anchoring the clamping band means in the external surfaces of the rotating member and of the counterweight means, with bent-down lateral clamping band portions whose bent-down edges are operable to dig into the surfaces of the counterweight means and of the rotating member.

78. A balancing arrangement according to claim 74, wherein said counterweight means is made up from one or more plate-like members dependent on the required weight, said plate-like members being provided with pressed-out means to enable assembly of the required number of plate-like members in stacked relationship.

79. A balancing arrangement according to claim 77, wherein said plate-like members are of similar dimensions whose weights are changed by at least one of number, size and location of the openings.

80. A balanced clamp structure according to claim 74, for balancing imbalances in a rotating member which are smaller than the weight of the tightening and connecting means, further comprising initial balancing means fixed to said clamp structure to provide a clamp structure fully balanced in itself by a counterweight fixedly secured to the clamping band means in the area substantially opposite the first mentioned area containing said connecting and tightening means.

81. A clamp structure according to claim 51, wherein said groove-like reinforcing indentations are located in said bridging portion substantially symmetrically with respect to the longitudinal center plane of the clamping band means, and wherein the depth of each of said groove-like reinforcing indentations from the top of the bridging portion to the lower surface of the bottom is of the order of about 55% to about 65% of the height of the ear means from the top of the bridging portion to the bottom surface of the clamping band means in its rectilinear condition.

82. A clamp structure according to claim 81, wherein said connecting means includes in one of said band end portions at least one pressed-out, deep-drawn support hook and one tab-like combined guide and support hook bent out of the clamping band means about an axis extending generally in the clamping band longitudinal direction, and in the other band end portion at least one approximately rectangular aperture for engagement by said support hook and one slot-like aperture extending generally in the clamping band longitudinal direction for engagement by said combined guide and support hook.

83. A clamp structure according to claim 82, wherein said combined guide and support hook includes an upwardly extending oblique guide surface and a forwardly extending tip with a slightly downwardly extending tip end portion to prevent disengagement of the outer band portion from the combined guide and support hook.

\* \* \* \* \*